United States Patent [19]

Kanamori et al.

[11] Patent Number: 4,988,172
[45] Date of Patent: Jan. 29, 1991

[54] OPTICAL SYSTEM FOR ENDOSCOPES

[75] Inventors: Iwao Kanamori, Fussa; Akira Kikuchi, Hachiouji; Minoru Okabe, Yokohama, all of Japan

[73] Assignee: Olympus Optical Co., Ltd., Tokyo, Japan

[21] Appl. No.: 303,142

[22] Filed: Jan. 30, 1989

[30] Foreign Application Priority Data

Jan. 30, 1988 [JP] Japan ................................ 63-19906
May 6, 1988 [JP] Japan ............................... 63-110172

[51] Int. Cl.$^5$ ............................................. G02B 23/00
[52] U.S. Cl. ................................................... 350/413
[58] Field of Search ................................ 350/413, 573

[56] References Cited

U.S. PATENT DOCUMENTS 4,735,491  4/1988  Takahashi ........................... 350/413

FOREIGN PATENT DOCUMENTS 5446671  10/1980  Japan .
6382404   4/1988  Japan .

Primary Examiner—Bruce Y. Arnold
Assistant Examiner—Rebecca D. Gass
Attorney, Agent, or Firm—Cushman, Darby & Cushman

[57] ABSTRACT

An optical system for endoscopes is provided with an inhomogeneous lens configured, as a relay lens, so that refractive index reduces progressively in going from a center portion toward a periphery and at least one of an entrance end face and an exit end face satisfies the following condition:

$$0.15\, P < C < 0.35\, P$$

where P is the pitch of the inhomogeneous lens and C is distance from the entrance end face or the exit end face of the inhomogeneous lens to the imaging position closest to the end face in the lens. The optical system for endoscopes is low in manufacturing cost and allows a favorable image of an object to be observed in a clear field of view without being adversely affected by dirt and burr.

13 Claims, 8 Drawing Sheets

OPTICAL SYSTEM FOR ENDOSCOPES

BACKGROUND OF THE INVENTION (a) Field of the Invention

The present invention relates to an optical system for endoscopes provided with a relay lens comprising an inhomogeneous lens whose refractive index reduces progressively in going from a center portion toward a periphery.

(b) Description of the Prior Art

Since an inhomogeneous lens has a refracting power in medium per se and retains an imaging function only in the configuration of a tiny rod-shaped member even though its end surface is not ground to a spherical surface, it is used as an image transmitting optical system for extremely fine endoscopes. An example of the optical system for endoscopes provided with the image transmitting optical system of the type is given in FIG. 1. In this figure, reference numeral 1 denotes an objective lens unit composed of two plano-convex lenses whose convex surfaces are arranged in such a manner as to face to each other and forming an image $M_1$ of an object M on a plane of exit thereof. To this plane of exit is cemented an inhomogeneous rod lens 2 having a length of nP (P is the pitch of an inhomogeneous medium which brings about, for example, twice relay functions, namely, imaging functions with a length of 1P and n is the positive integer) and on an exit end face of the inhomogeneous rod lens is cemented a cover glass 3 keeping dirt off the exit end face and preventing an object image $M_2$ formed on the exit end face from being viewed together with dirt. The optical arrangement on the rear side of the cover glass 3 comprises a relay lens unit 4 for erecting the object image $M_2$ formed by the inhomogeneous rod lens 2 and correcting chromatic aberration of magnification and axial chromatic aberration which are generated through the inhomogeneous rod lens 2, an aperture stop 5 arranged in an pupil position of the relay lens unit 4 and allowing the reduction of flare as well as the adjustment of a depth of field and the uniformity of brightness in a visual field, a field lens 6 arranged on the rear side of the relay lens unit 4 and adjusting the position and size of an eye point ExP, a field stop 7 disposed in an imaging position of an image $M_3$ formed through the relay lens unit 4 and the field lens 6, an eyepiece 8 arranged behind the field stop 7 and magnifying the image $M_3$ defined by the field stop 7, and a cover glass 9 disposed behind the eyepiece 8.

In such an optical system, although individual optical components are arranged so that the object image produced through the objective lens unit 1 is formed on an entrance end face and exit end face of the inhomogeneous rod lens 2, a problem has been encountered that it is difficult for the inhomogeneous rod lens 2 to prevent the periphery of the entrance and exit end faces from being damaged into fine flaws (a so-called burr) when the end faces are polished and as such, in the above arrangement, the burr will be viewed together with the object image and will bring troubles of observation. Further, another problem has arisen that, during the assembly of the optical system, if minute dust adhering to a lens frame and the like and dirt such as cutting chips of metal parts are attached to the entrance end face of the inhomogeneous rod lens 2, they will be viewed together with the object image and will cause observation to be difficult. In addition, there also has been a problem that since the relay lens unit 4 consists of two lens groups, the manufacturing cost of the entire optical system is high.

An optical system disclosed in, for example, Japanese Utility Model Preliminary Publication No. Sho 55-147013, proposed with the intention of solving these problems makes use of an inhomogeneous rod lens 10, as shown in FIG. 2, with a length of (n/2)P somewhat different (the rod lens shown is some shorter than (n/2)P from that of FIG. 1 and is designed so that the image $M_2$ transmitted through the rod lens is formed in front or rear of the exit end face of the inhomogeneous rod lens 10 and so that the image is directly observed through the eyepiece 8. According to this structure, although the dirt and flaws on the exit end face of the inhomogeneous rod lens 10 are not viewed, a problem has been posed that the dirt and flaws on the entrance end face are still viewed along with the object image and as such observation is difficult. Also, there has been a problem that since the structure fails to include any optical system for correcting the chromatic aberration produced through the inhomogeneous rod lens 10, the image will suffer considerable deterioration. Further, although it is considered that the aperture stop is disposed on the side of the objective lens unit 1, namely, at a point A indicated in FIG. 2 because there is no space sufficient to place the aperture stop on the rear side of the inhomogeneous rod lens 10, it has been extremely difficult for the accuracy and making of parts to provide a doughnut-shaped stop in the objective lens which is no more than 1 mm in diameter.

SUMMARY OF THE INVENTION

It is therefore a primary object of the present invention to provide an optical system for endoscopes bringing about an observation image which is low in manufacturing cost and favorable.

Another object of the present invention is to provide an optical system for endoscopes capable of observing an image of an object in a clear visual field without being adversely affected by dirt and burr.

These objects are accomplished, according to the present invention, by making use of, as a relay lens of the optical system for endoscopes, an inhomogeneous lens constructed so that refractive index reduces progressively in going from a center portion toward a periphery and at least one of an entrance end face and an exit end face thereof satisfies the following condition:

$$0.15\ P < C < 0.35\ P \tag{1}$$

where P is the pitch (period) of the inhomogeneous lens, namely, the distance from the entrance end face of the inhomogeneous lens where the object image is formed to the position where the image is once invertedly reformed and further invertedly reformed as an orthographic image, and C is the distance from the entrance end face or the exit end face of the inhomogeneous lens to the imaging position in the lens closest to the end face.

According to the present invention, the entrance end face and the exit end face of an inhomogeneous image transmitting optical system are widely separated from the position of a relayed image, namely, each of them is not in a position conjugate with that of the image, so that even though relatively large dirt adheres to each end face and flaws and burr are produced on each end face, they will not cause the observation of the image to be difficult.

According to a preferred formation of the present invention, an aperture stop is provided at the entrance end face or the exit and face of the inhomogeneous image transmitting optical system satisfying condition (1). Where the aperture stop is disposed at the exit end face, its setting position corresponding to a holding portion of the endoscope, that is, to a large diameter portion thereof makes it possible to increase the outside diameter of the aperture stop and a focal length of a lens system located in rear of the exit end face, which is longer than that of an objective lens unit, enables the inside diameter of the aperture stop to be increased in the case where numerical aperture is the same, with resultant easy setting of the aperture stop.

According to the present invention, where the optical system is arranged so that the object image is formed on the entrance end face of the inhomogeneous image transmitting optical system, the exit end face or its vicinity assumes a pupil position, so that an imaging lens is required for imaging a beam of light emanating virtually in parallel from the inhomogeneous image transmitting optical system and is constructed as an achromatic doublet lens consisting of a common glass lens, thereby allowing the correction of chromatic aberration of magnification and axial chromatic aberration generated by the inhomogeneous lens.

Further, according to the present invention, since an image is produced outside the inhomogeneous image transmitting optical system, a field stop can be arranged at the position of the image and, as a result, the image and the inside diameter portion of the field stop are simultaneously focused to be viewed with great ease. Also, where the endoscope is of a side-view type, an image rotator can be disposed behind the inhomogeneous rod lens, so that a normal image is available.

These and other objects as well as the features and advantages of the present invention will become apparent from the following detailed description of the preferred embodiment when taken in conjunction with the accompanying drawings.

DESCRIPTION OF THE PREFERRED EMBODIMENTS

Figure 1:
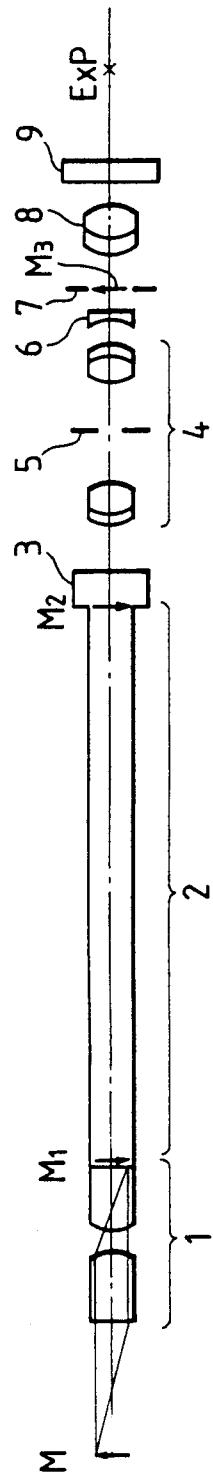
FIGS. 1 and 2 are views showing conventional examples different from each other.
Figure 2:
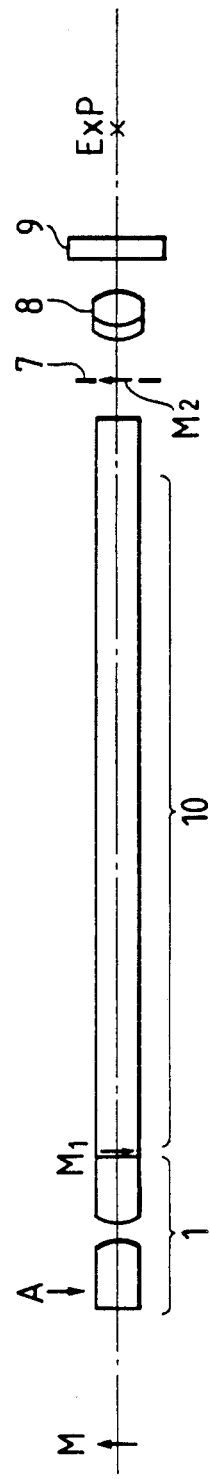

Referring now to the drawings, various embodiments of an optical system for endoscopes according to the present invention will be described in the following. In the figures, like reference numerals are used to designate like functional members employed in the preceding conventional examples.

Figure 3:
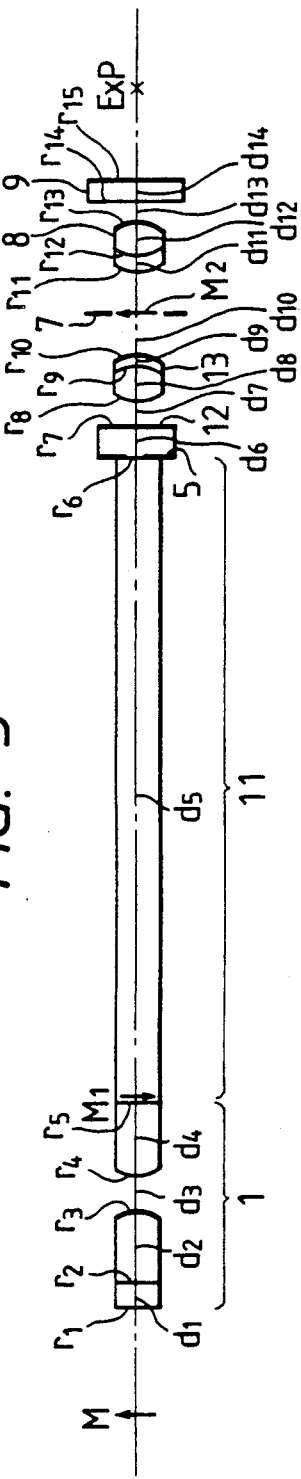
FIG. 3 is a view showing an embodiment of an optical system for endoscopes according to the present invention.

FIG. 3 shows a first embodiment, in which reference numeral 11 represents an inhomogeneous rod lens having a length of $((n/2)+0.25)$ P, cemented to the objective lens unit 1, the image $M_1$ transmitted through the objective lens unit 1 is formed on an entrance end face of the rod lens 11 or in its vicinity, and an exit end face thereof or its vicinity assumes a pupil position. Reference numeral 12 represents a cover glass, on a front surface of which the aperture stop 5 is sticked or evaporated and the front surface of which is cemented to the exit end face of the inhomogeneous rod lens 11, and 13 an imaging lens consisting of a cemented doublet lens arranged on the rear side of the cover glass 12.

With the first embodiment constructed as in the foregoing, the exit end face of the inhomogeneous rod lens 11 or its vicinity becomes the pupil position where the image is not formed, so that dirt will not be viewed together with the image even though the cover glass is not provided. Also, when the length of the inhomogeneous rod lens 11 is represented by L, the range of the length is given by $$((n/2)+0.15) P < L < ((n/2)+0.35)P$$

(where n is the integer). However, if the length L lies outside this range, the dirt will be viewed together with the image. Further, since the aperture stop 5 is located at the exit end face of the inhomogeneous rod lens and in general, this position corresponds to a holding portion, namely, a large diameter portion of the endoscope, the outside diameter of the aperture stop 5 can be designed to be larger. Moreover, although the numerical aperture of the objective lens unit 1 is the same as that of the ½ - time relay lens 13, the focal length of the ½ - time relay lens 13 is much larger than that of the objective lens unit 1, with the result that the inside diameter of the aperture stop 5 can also be structured to be larger. Accordingly, the provision of the aperture stop 5 makes it possible to facilitate the accuracy and making of parts. It is also advantageous that the aperture stop 5, which is placed on the cover glass 12, can be thin formed. Further, the ½ - time relay lens 13 is required to bring about an image of moderate size and is constructed as an achromatic doublet lens as illustrated, thereby allowing the correction of chromatic aberration of magnification and axial chromatic aberration caused by the inhomogeneous rod lens 11. Also, the image $M_2$ is produced outside the inhomogeneous rod lens 11 and the field stop 7 is arranged at the position of the image $M_2$, so that the image $M_2$ and the inside diameter portion of the field stop 7 are focused at the same time to be viewed with great ease. From the above results, therefore, a favorable observation image is derived. The relay lens 13 is composed of a single group lens at a moderate cost and as such a manufacturing cost is also low.

Next, numerical data concerning the first embodiment are shown as follows:

| | | | |
|---|---|---|---|
| $r_1 = \infty$ | | | |
| | $d_1 = 0.5$ | $n_1 = 1.51633$ | $\nu_1 = 64.1$ |
| $r_2 = \infty$ | | | |
| | $d_2 = 1.08$ | $n_2 = 1.7725$ | $\nu_2 = 49.6$ |
| $r_3 = -1.172$ | | | |
| | $d_3 = 0.2$ | | |
| $r_4 = 1.172$ | | | |
| | $d_4 = 1.08$ | $n_3\ 1.7725$ | $\nu_3 = 49.6$ |
| $r_5 = \infty$ | | | |
| | $d_5 = 234.675$ (aperture stop) | $n_4$ (inhomogeneity) | $\nu_4 = —$ |
| $r_6 = \infty$ | | | |
| | $d_6 = 1.0$ | $n_5 = 1.51633$ | $\nu_5 = 64.1$ |
| $r_7 = \infty$ | | | |
| | $d_7 = 14.41$ | | |
| $r_8 = 11.69$ | | | |
| | $d_8 = 1.87$ | $n_6 = 1.58913$ | $\nu_6 = 61.2$ |
| $r_9 = -4.558$ | | | |

-continued

Figure 4:
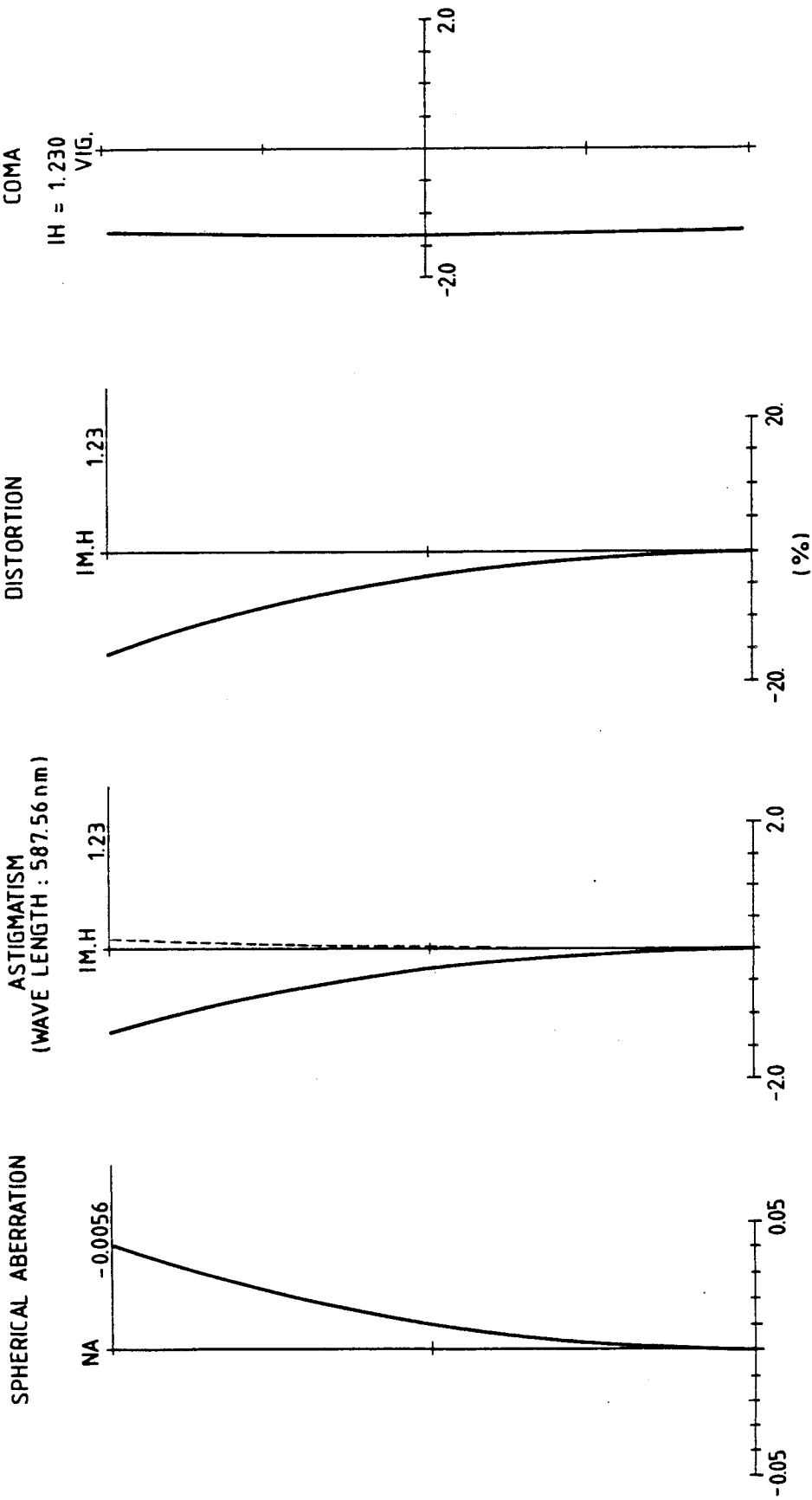
FIG. 4 is graphs showing aberration states of the embodiment of FIG. 3.

| | | | |
|---|---|---|---|
| $r_{10} = -15.381$ | $d_9 = 0.82$ | $n_7 = 1.6727$ | $\nu_7 = 32.1$ |
| | $d_{10} = 37.24$ | | |
| $r_{11} = 35.654$ | | | |
| | $d_{11} = 1.06$ | $n_8 = 1.78422$ | $\nu_8 = 25.7$ |
| $r_{12} = 12.001$ | | | |
| | $d_{12} = 2.09$ | $n_9 = 1.66672$ | $\nu_9 = 48.3$ |
| $r_{13} = -23.387$ | | | |
| | $d_{13} = 5.7$ | | |
| $r_{14} = \infty$ | | | |
| | $d_{14} = 2.0$ | $n_{10} = 1.51633$ | $\nu_{10} = 64.1$ |
| $r_{15} = \infty$ | | | | f = 2.466, Angle of view $2\omega = 61.3°$, Distance from first lens surface to object = 10.0, Length of relay lens = 5.25 P Also, various aberrations in the first embodiment are as shown in FIG. 4.

Figure 5:
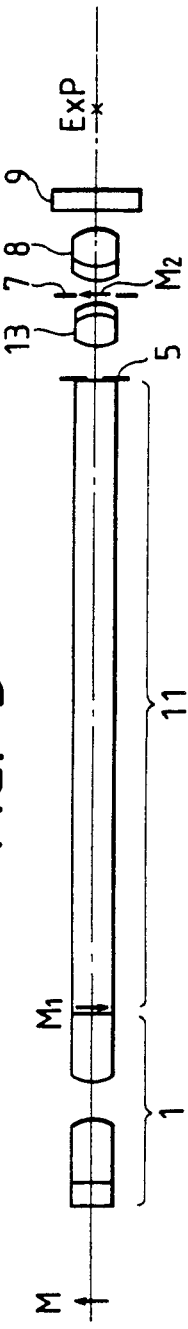
FIGS. 5 to 20 are views showing other embodiments, different from each other, of the optical system for endoscopes according to the present invention.

FIG. 5 shows a second embodiment, which is different from the first embodiment in that the aperture stop 5, unlike FIG. 3, is not provided on the cover glass 12 alternately is sticked on the exit end face of the inhomogeneous rod lens 11.

Figure 6:
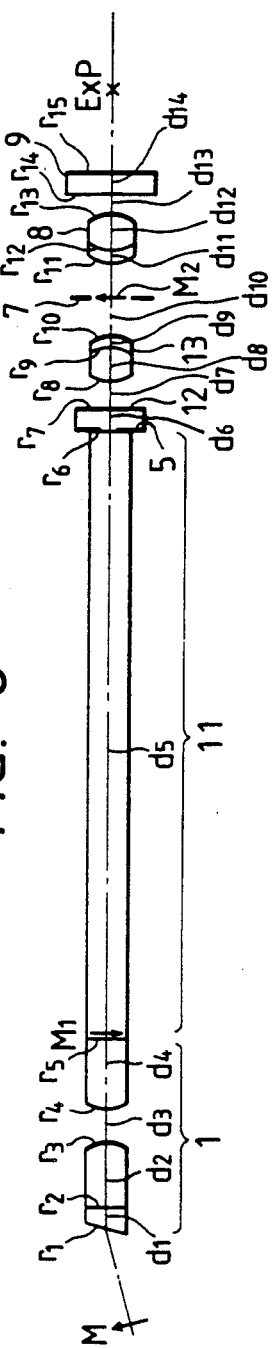

FIG. 6 depicts a third embodiment, which is different from the first embodiment in that a wedge prism having a plane of incidence inclined to an optical axis is cemented to the top of the objective lens unit 1 so that the objective lens unit 1 is adapted for a back-view type endoscope. Its functions and features, however, are the same as in the first embodiment. Now, numerical data relative to the third embodiment in the case where an angle of oblique view is 14.7° are shown in the following.

| | | | |
|---|---|---|---|
| $r_1 = \infty$ | | | |
| | $d_1 = 0.54$ | $n_1 = 1.51633$ | $\nu_1 = 64.1$ |
| $r_2 = \infty$ | | | |
| | $d_2 = 1.08$ | $n_2 = 1.7725$ | $\nu_2 = 49.6$ |
| $r_3 = -1.172$ | | | |
| | $d_3 = 0.2$ | | |
| $r_4 = 1.172$ | | | |
| | $d_4 = 1.08$ | $n_3 = 1.7725$ | $\nu_3 = 49.6$ |
| $r_5 = \infty$ | | | |
| | $d_5 = 234.675$ | $n_4$ (inhomogeneity) | $\nu_4 = -$ |
| $r_6 = \infty$ | (aperture stop) | | |
| | $d_6 = 1.0$ | $n_5 = 1.51633$ | $\nu_5 = 64.1$ |
| $r_7 = \infty$ | | | |
| | $d_7 = 14.41$ | | |
| $r_8 = 11.69$ | | | |
| | $d_8 = 1.87$ | $n_6 = 1.58913$ | $\nu_6 = 61.2$ |
| $r_9 = -4.558$ | | | |
| | $d_9 = 0.82$ | $n_7 = 1.6727$ | $\nu_7 = 32.1$ |
| $r_{10} = -15.381$ | | | |
| | $d_{10} = 37.24$ | | |
| $r_{11} = 35.654$ | | | |
| | $d_{11} = 1.06$ | $n_8 = 1.78422$ | $\nu_8 = 25.7$ |
| $r_{12} = 12.001$ | | | |
| | $d_{12} = 2.09$ | $n_9 = 1.66672$ | $\nu_9 = 48.3$ |
| $r_{13} = -23.387$ | | | |
| | $d_{13} = 5.7$ | | |
| $r_{14} = \infty$ | | | |
| | $d_{14} = 2.0$ | $n_{10} = 1.51633$ | $\nu_{10} = 64.1$ |
| $r_{15} = \infty$ | | | | f = 2.466, Angle of view $2\omega = 77.8°$, Distance from first lens surface to object = 10.0, Length of relay lens = 5.25 P Various aberrations in the third embodiment are as shown in FIG. 4.

Figure 7:
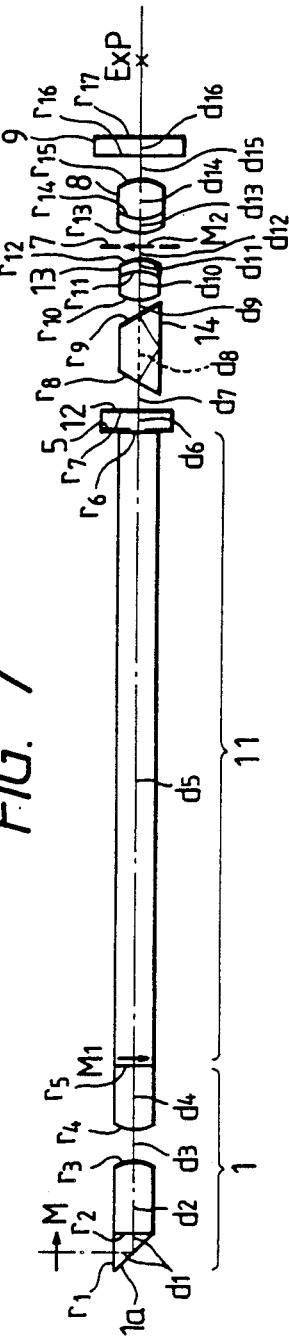

FIG. 7 illustrates a fourth embodiment, which is different from the first embodiment in that a reflecting prism is cemented to the top of the objective lens unit 1 so that the objective lens unit 1 is adapted for a sideview type endoscope. In this embodiment, an image rotator is arranged between the cover glass 12 and the ½-time relay lens 13 so as to turn a mirror image formed by a reflective prism 1a in the objective lens unit 1 to a normal image. However, where a roof prism is used as the reflecting prism 1a, the image rotator 14 is not required. The following is numerical data relating to the fourth embodiment.

| | | | |
|---|---|---|---|
| $r_1 = \infty$ | | | |
| | $d_1 = 1.0$ | $n_1 = 1.51633$ | $\nu_1 = 64.1$ |
| $r_2 = \infty$ | | | |
| | $d_2 = 1.08$ | $n_2 = 1.7725$ | $\nu_2 = 49.6$ |
| $r_3 = -1.172$ | | | |
| | $d_3 = 0.2$ | | |
| $r_4 = 1.172$ | | | |
| | $d_4 = 1.08$ | $n_3 = 1.7725$ | $\nu_3 = 49.6$ |
| $r_5 = \infty$ | | | |
| | $d_5 = 234.675$ | $n_4$ (inhomogeneity) | $\nu_4 = -$ |
| $r_6 = \infty$ | | | |
| | $d_6 = 1.0$ | $n_5 = 1.51633$ | $\nu_5 = 64.1$ |
| $r_7 = \infty$ | | | |
| | $d_7 = 5.5$ | | |
| $r_8 = \infty$ | | | |
| | $d_8 = 8.84$ | $n_6 = 1.8061$ | $\nu_6 = 40.9$ |
| $r_9 = \infty$ | | | |
| | $d_9 = 3.63$ | | |
| $r_{10} = 11.69$ | | | |
| | $d_{10} = 1.87$ | $n_7 = 1.5893$ | $\nu_7 = 61.2$ |
| $r_{11} = -4.558$ | | | |
| | $d_{11} = 0.82$ | $n_8 = 1.6727$ | $\nu_8 = 32.1$ |
| $r_{12} = -15.381$ | | | |
| | $d_{12} = 37.24$ | | |
| $r_{13} = 35.654$ | | | |
| | $d_{13} = 1.06$ | $n_9 = 1.78472$ | $\nu_9 = 25.7$ |
| $r_{14} = 12.001$ | | | |
| | $d_{14} = 2.09$ | $n_{10} = 1.66672$ | $\nu_{10} = 48.3$ |
| $r_{15} = -23.387$ | | | |
| | $d_{15} = 5.7$ | | |
| $r_{16} = \infty$ | | | |
| | $d_{16} = 2.0$ | $n_{11} = 1.51633$ | $\nu_{11} = 64.1$ |
| $r_{17} = \infty$ | | | | f = 2.466, Angle of view $2\omega = 61.3°$, Distance from first lens surface to object = 10.0, Length of relay lens = 5.25 P Also, various aberrations in the fourth embodiment are as shown in FIG. 4.

In the first, third and fourth embodiments, reference symbol f represents the compound focal length of all other lenses except for the eyepiece, $r_1$ to $r_{17}$ the radii of curvature of the surfaces of individual optical elements and lens elements, $d_1$ to $d_{11}$ the thicknesses, along the optical axis, of individual optical elements, lens elements, and airspaces between them, $n_1$ to $n_{11}$ the refractive indices of individual optical elements and lens elements, and $\nu_1$ to $\nu_{11}$ the Abbe numbers of individual optical elements and lens elements.

Figure 8:
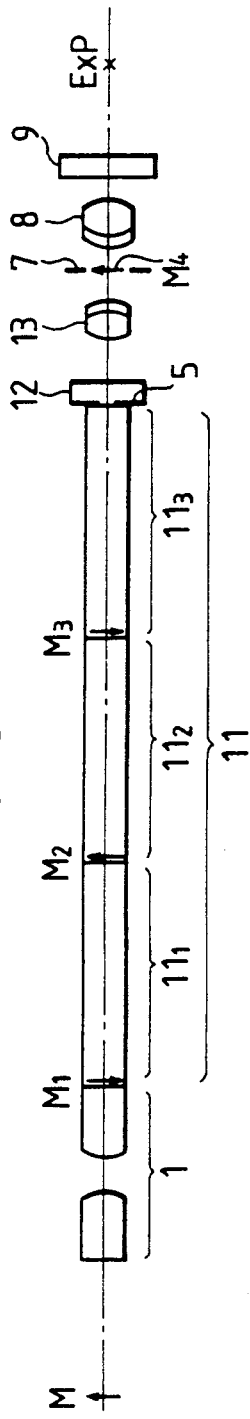

FIG. 8 shows a fifth embodiment, in which the inhomogeneous rod lens 11 is configured by cementing a plurality of, for example, three inhomogeneous lenses $11_1$, $11_2$, $11_3$ to each other at the imaging positions or in their vicinities and in which a length $L_3$ of the rearmost inhomogeneous lens $11_3$ is defined as $((n/2)+0.15)$ $P < L_3 < ((n/2)+0.35)$ P and lengths $L_1$, $L_2$ between the imaging positions on the incident side and the exit end faces, of the other inhomogeneous lenses $11_1$, $11_2$ are defined as $L_1 = L_2 = (n/2)$ P (In this figure, the lengths $L_1$, $L_2$ are each depicted as $(n/2)$ P and $L_3$ as 0.25 P). In the fifth embodiment, therefore, the making of the rod lens is technically facilitated in comparison with the case of a lengthy inhomogeneous lens and a plurality of inexpensive, short inhomogeneous lenses are used, so that manufacture is easy and its cost is reduced.

Figure 9:
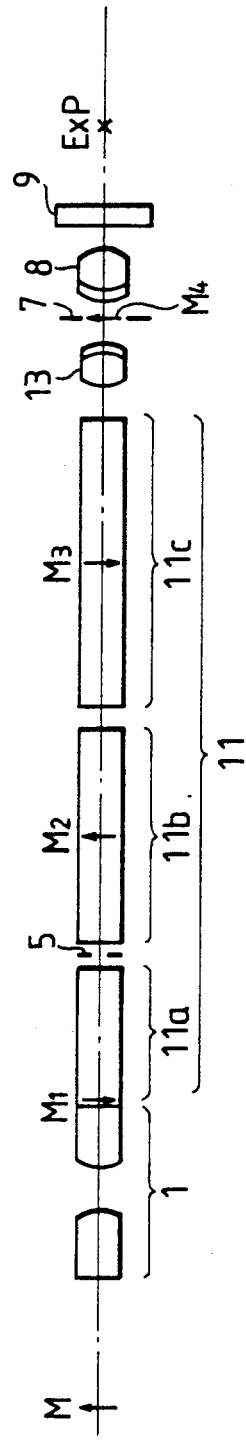

FIG. 9 depicts a sixth embodiment, in which the inhomogeneous rod lens 11 is cut at the pupil positions or their vicinities to be configured to consist of plural, for example, three inhomogeneous lenses $11_a$, $11_b$, $11_c$ and the aperture stop 5 is arranged between the inhomogeneous lenses $11a$, $11b$. In this instance, a length La from the entrance end face to the exit end face, of the headmost inhomogeneous lens $11a$ is given by $((n/2)+0.15)$ $P < La < ((n/2)+0.35)$ P (the length La shown is 0.25 P) and lengths Lb, Lc of the other inhomogeneous lens $11b$, $11c$ are given by $Lb = Lc = (n/2)$ P (the figure shows $n=1$). However, where the diameter of the inhomogeneous rod lens 11 is fine, it is not easy to provide the aperture stop 5 thereto. Also, in the pupil position where the aperture stop 5 is not arranged, the inhomogeneous lenses may be cemented to each other. Even though they are not cemented, there is no fear that dirt lying therein is viewed along with the image. The above each embodiment is designed so that the exit end face of the inhomogeneous lens satisfies $0.15$ $P < C < 0.35$ P, whereas the following each embodiment is constructed so that both the entrance end face and the exit end face satisfy $0.15$ $P < C < 0.35$ P.

Figure 10:
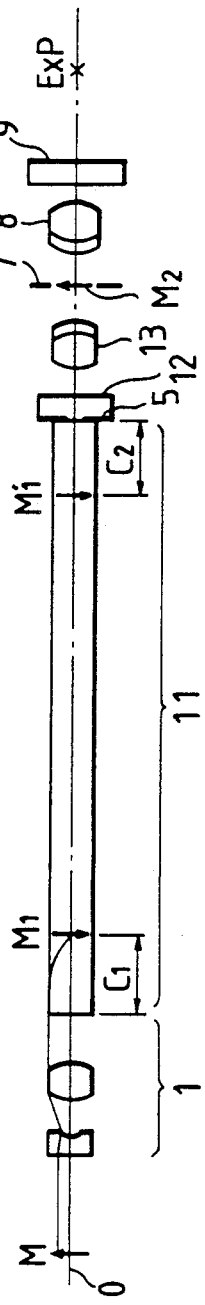

FIG. 10 depicts a seventh embodiment. In this embodiment, the rod-shaped inhomogeneous lens 11 with a length of $\frac{1}{2}$ nP which depends on the number of relays is arranged on the exit side of the objective lens unit 1 configured as an afocal system and the cover glass 12 is sticked on the plane of exit, with the aperture stop 5 sandwiched between them. Further, the imaging lens 13 for aberration correction and for $\frac{1}{2}$ - time relay is disposed in the rear thereof and the field stop 7 is arranged in the vicinity of a rear focal point thereof, followed by the eyepiece 8 and the cover glass 9 so that a front focal point coincides virtually with the rear focal point of the imaging lens 13.

In such an arrangement, an axial light beam coming from the object M which exists at a infinitely far distance emanates from the objective lens unit 1 in parallel with an optical axis O and forms the object image $M_1$ at the position of $C_1 = \frac{1}{4}$ P from the plane of incidence due to the refracting function of the inhomogeneous rod lens 11. Because the length of the inhomogeneous rod lens 11 is $\frac{1}{2}$ nP, a last image $M_1$ in the inhomogeneous rod lens 11 is formed at the position of $C_2 = \frac{1}{4}$ P from the plane of exit and the light beam emerges parallel with the optical axis from the inhomogeneous rod lens 11 through the aperture stop 5. The image $M_2$ is then formed at the position of the field stop 7 in virtue of the imaging lens 13 and, after this, the light beam will emanate from the eyepiece 8 as parallel rays. In such a manner, the seventh embodiment is constructed so that any of the objective lens unit 1, inhomogeneous rod lens 11, imaging lens 13 and eyepiece 8 assumes the afocal system, with the result that the position of the entrance end face of the inhomogeneous rod lens 11 coincides virtually with that of the pupil of the optical system and the flaws and dirt can be viewed at a minimum. Further, with this arrangement, the aperture stop 5 can be disposed at the plane of exit of the inhomogeneous rod lens 11 and can also cover the burr produced at the edge of the end face of the inhomogeneous rod lens without reducing the range of the visual field, so that more favorable results are brought about.

Figure 11:
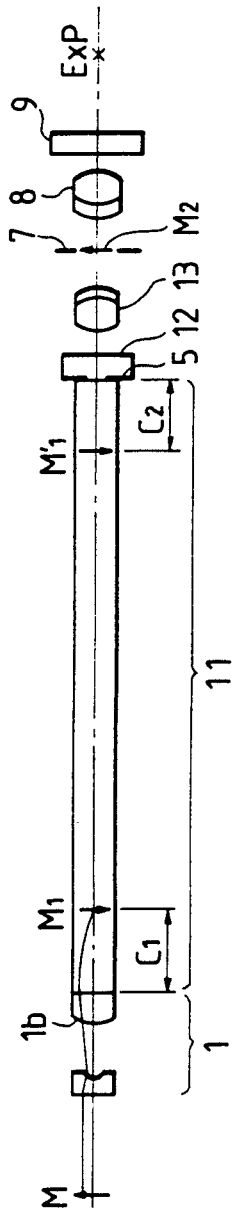

FIG. 11 shows an eighth embodiment, in which since a lens, namely, a positive lens $1b$ provided on the side of the inhomogeneous rod lens 11, of the objective lens unit 1 is cemented to the entrance end face of the inhomogeneous rod lens 11, the dirt is prevented from adhering on the entrance end face. Further, the flaws and burr on the entrance end face are buried with an adhesive and low refractive indices of the adhesive and glass make it difficult to view the flaws.

Figure 12:
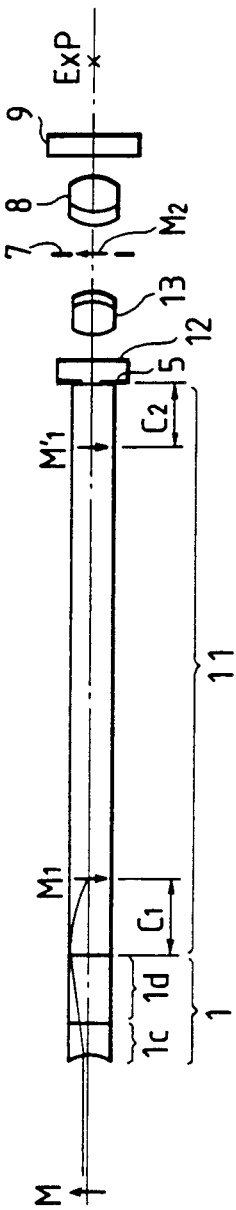

FIG. 12 shows a ninth embodiment, in which a concave surface of a negative lens $1c$ of the objective lens unit 1 is directed to the object side and a positive lens $1d$ thereof is configured from the inhomogeneous lens with a length of about 0.2 P to construct the overall length as the afocal system, both of which are cemented to the entrance end face of the inhomogeneous rod lens 11.

Figure 13:
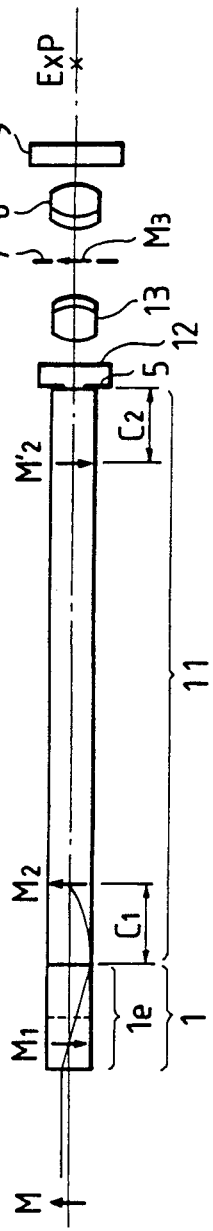

FIG. 13 illustrates a tenth embodiment, in which the objective lens unit 1 comprises an inhomogeneous lens $1e$ having refractive index distribution that the refractive index diminishes progressively in going from the center portion to the periphery and that power increases from the object side toward the eyepiece along a direction of the optical axis and constructed as the afocal system. For these reasons, the arrangement is such that the object image $M_1$ is formed once in the objective lens unit 1. Also, as indicated with a broken line in the figure, two types of inhomogeneous lenses different in power from each other may be cemented to thereby configure the objective lens unit 1.

Figure 14:
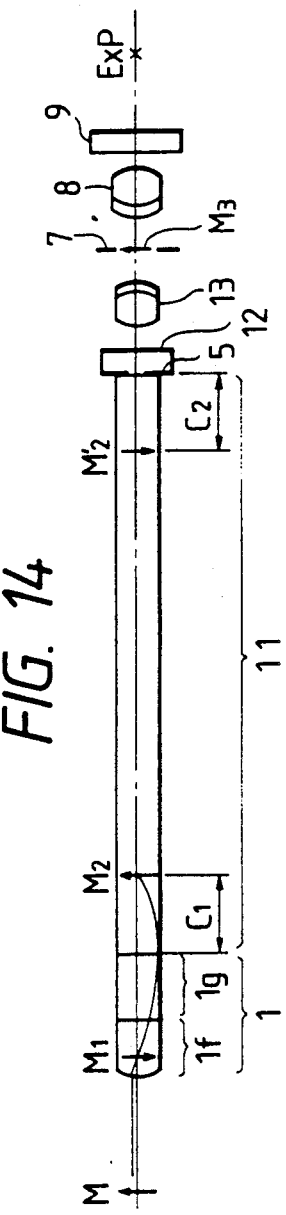

FIG. 14 shows an eleventh embodiment, in which the objective lens unit 1 is configured from a positive lens $1f$ consisting of homogeneous glass and the like and an inhomogeneous lens $1g$ with a length of about 0.3 P to construct the overall length as the afocal system, both of which are cemented to the entrance end face of the inhomogeneous rod lens 11.

Figure 15:
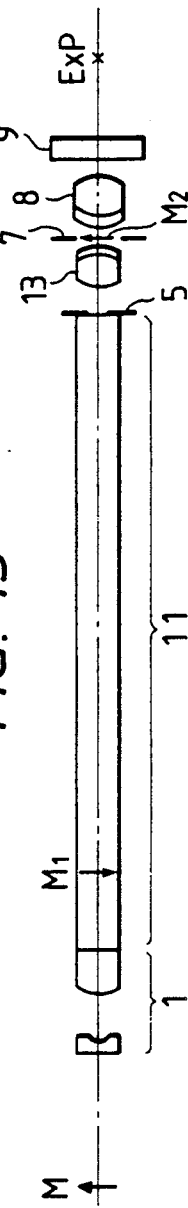

FIG. 15 shows a twelfth embodiment, in which the aperture stop 5 is sticked alone on the exit end face of the inhomogeneous rod lens 11, without placing on the cover glass.

Figure 16:
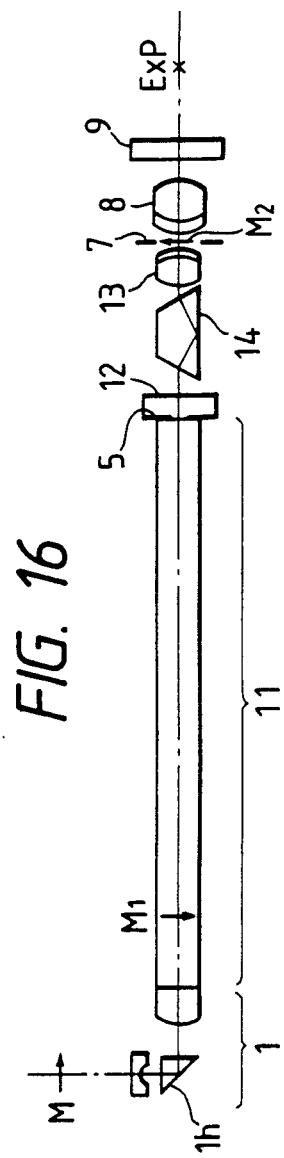

FIG. 16 shows a thirteenth embodiment, in which the image rotator 14 is arranged between the cover glass 12 and the imaging lens 13 so that the mirror image formed by a reflecting prism $1h$ in the objective lens unit 1 is truned to the normal image. Also, where the reflecting prism $1h$ is a roof prism, the image rotator 14 is unnecessary.

Figure 17:
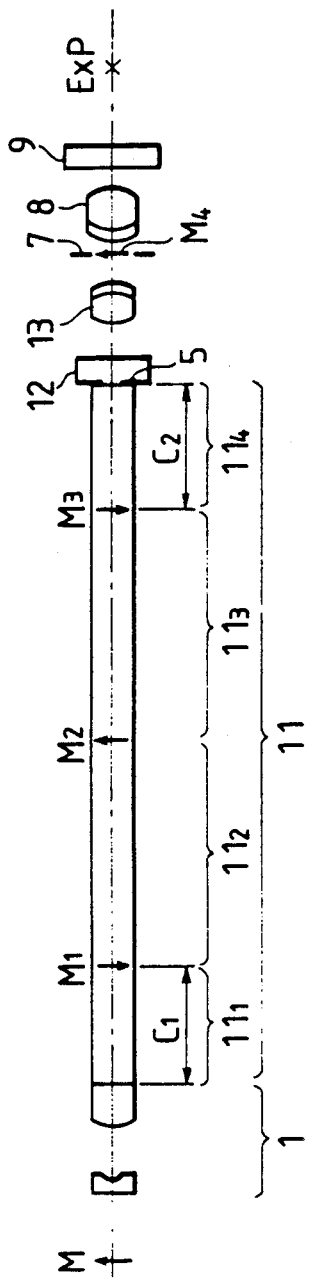

FIG. 17 depicts a fourteenth embodiment, in which the inhomogeneous rod lens 11 comprises a plurality of, for example, four inhomogeneous lenses $11_1$, $11_2$, $11_3$, $11_4$ configured to be cemented to each other in such a way that each cemented face is located at the position of the image or in its vicinity. In this case, the lengths $C_1$, $C_2$ of the inhomogeneous lenses $11_1$, $11_4$ are each determined to satisfy the condition of $0.15 < C < 0.35$ P. According to this embodiment, each length of the inhomogeneous lenses can be diminished, so that manufacture is easy and its cost is low.

Figure 18:
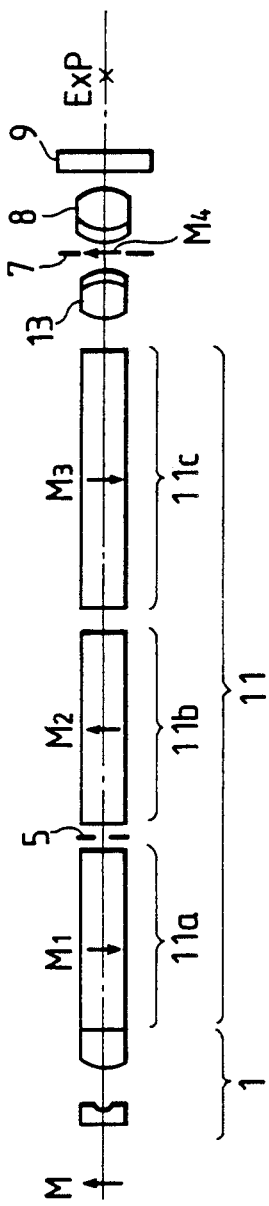

FIG. 18 depicts a fifteenth embodiment, in which the inhomogeneous rod lens 11 is composed of a plurality of, for example, three inhomogeneous lenses $11a$, $11b$, $11c$ separated at the pupil positions or their vicinities so that each length is $(n/2)$ P and the aperture stop 5 inserted between the inhomogeneous lenses $11a$ and $11b$. Also, where the aperture stop 5 is not inserted, the inhomogeneous lenses $11a$, $11b$ may be cemented to each other. Further, because the separated positions are located at the pupil positions or in their vicinities, there is no fear that the dirt is viewed even though the inhomogeneous lenses are not cemented in particular.

Figure 19:
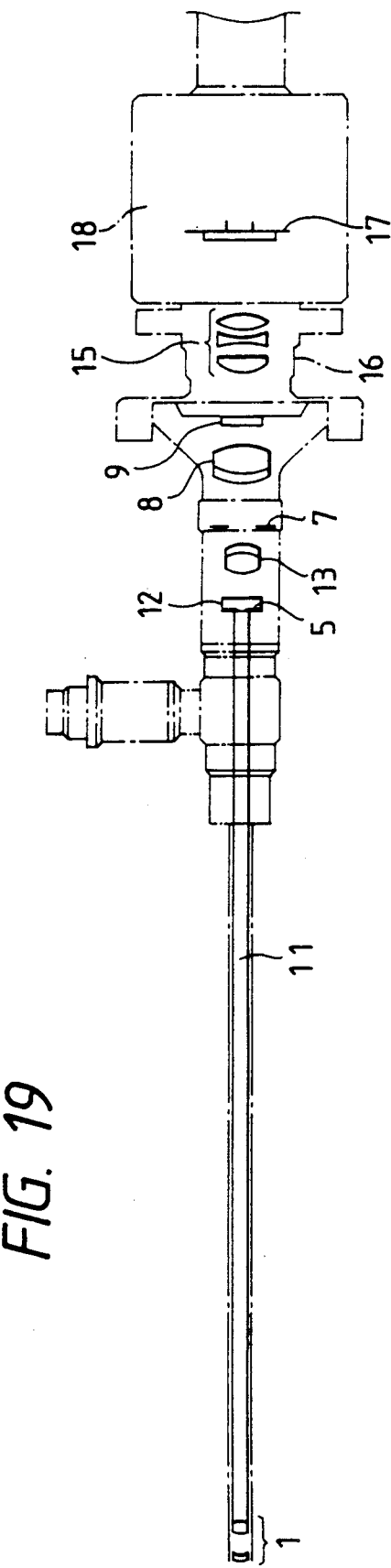

FIG. 19 shows a state that the arrangement of the embodiment illustrated in FIG. 11 is actually incorporated in the endoscope. This figure is such that a photographing adapter 16 housing a photographing lens unit 15 is attached to an eyepiece section of the endoscope and further a TV camera head 18 housing a solid-state image sensor 17 is mounted through the adapter. In this instance, the position of the image formed by the photographing lens unit 15 coincides with that of an image pickup surface of the solid-state image sensor 17.

Figure 20:
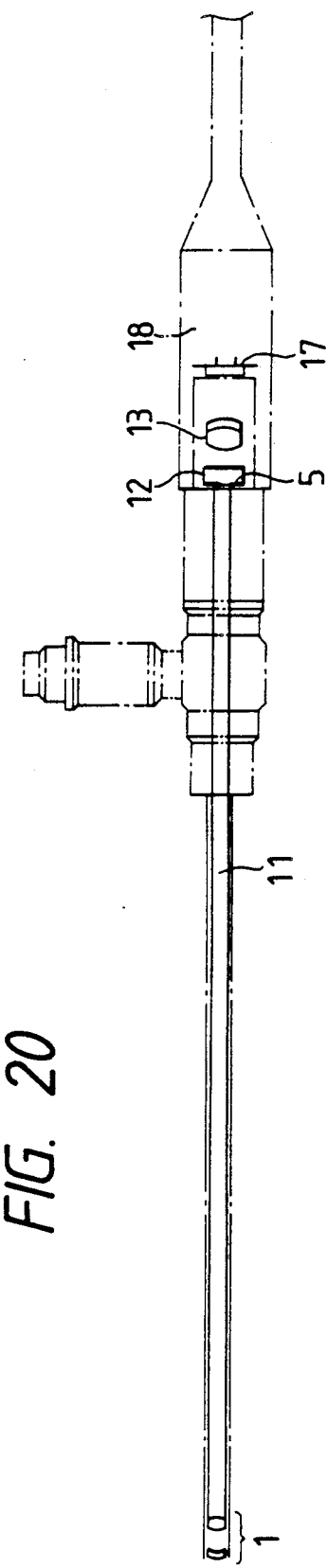

FIG. 20 shows a seventeenth embodiment, in which the eyepiece section is removed to directly mount the TV camera head 18. In such a case, the position of the image formed by the imaging lens 13 coincides with that of the image pickup surface of the solid-state image sensor 17 and the image pickup surface is also used as the field stop.

Any of the seventh to seventeenth embodiments is arranged so that the light beam incident in parallel on the inhomogeneous rod lens 11 emanates in parallel therefrom and, even though the position of the entrance end face of the inhomogeneous rod lens 11 is somewhat shifted from the position of $C_1 = C_2 = 1\frac{1}{4}$ P, the same effect can be expected. This range of the position is such as $0.15\ P < C_1 < 0.35\ P$. If the position of the entrance end face is out of this range, the planes of entrance and exit become closer to the image positions and consequently the flaws, burr and dirt will be viewed.

What is claimed is:

1. An optical system for endoscopes comprising, in order from an object side:

an objective lens unit;

an image transmitting optical system including an inhomogeneous lens having an entrance end face receiving light coming from said objective lens unit and an exit end face emanating the light received by said entrance end face and making refraction index small progressively in going from a center portion toward a periphery thereof;

an aperture stop provided on the exit end face of said inhomogeneous lens; and an imaging lens imaging a beam of light emanating from the exit end face, the exit end face of said inhomogeneous lens satisfying the following condition;

$$0.15\ P < C < 0.35\ P$$

where reference symbol P represents the pitch (period) of the homogeneous lens and C the distance from the exit end face of the inhomogeneous lens to the imaging position in the inhomogeneous lens closest to the end face.

2. An optical system for endoscopes according to claim 1, wherein the entrance end face of said inhomogeneous lens is located at a position where an image is substantially formed by said objective lens unit.

3. An optical system for endoscopes according to claim 1, wherein said objective lens unit assumes substantially an afocal system and the entrance end face satisfied the following condition;

$$0.15\ P < C' < 0.35\ P$$

where reference symbol P represents the pitch (period) of the inhomogeneous lens and C' the distance from the entrance end face of the inhomogeneous lens to the imaging position in the inhomogeneous lens closest to the end face.

4. An optical system for endoscopes according to claim 3, wherein the exit end face satisfies the condition $0.15\ P < C < 0.35\ P$.

5. An optical system for endoscopes according to claim 1 or 3, wherein said imaging lens is an achromatic doublet lens.

6. An optical system for endoscopes according to claim 1, further comprising an eyepiece provided in the rear of an imaging position of said imaging lens.

7. An optical system for endoscopes according to claim 1, further comprising a solid-state image sensor provided at an imaging position of said imaging lens.

8. An optical system for endoscopes according to claim 1, wherein said inhomogeneous lens is composed of a plurality of inhomogeneous lens components arranged in series along an optical axis, and the exit end face of an inhomogeneous lens component located farthest from said objective lens unit satisfies said condition $0.15\ P < C < 0.35\ P$.

9. An optical system for endoscopes according to claim 8, wherein said plurality of inhomogeneous lens components are cemented to each other at their imaging positions.

10. An optical system for endoscopes according to claim 9, wherein when a length of an inhomogeneous lens component located farthest from said objective lens unit is represented by $L_1$ and lengths of remaining inhomogeneous lens components are each represented by $L_2$, the following conditions are satisfied:

$$((n/2)+0.15)\ P < L_1 < ((n/2+0.35))\ P$$

$$L_2 = n/2\ P$$

where reference symbol n represents the positive integer.

11. An optical system for endoscopes according to claim 8, wherein said plurality of inhomogeneous lens components are arranged so as to be spaced end face to each other at pupil positions, each of said lens components in $n/2\ P$ in length, and the aperture stop is provided in one of spaces between said lens components.

12. An optical system for endoscopes according to claim 11, wherein an aperture stop is provided in one of the spaces between the lens components and arranged between an inhomogeneous lens component located closest to said objective lens unit and an inhomogeneous lens component subsequent thereto, and when a length of said inhomogeneous lens component located closest to said objective lens unit is represented by $L_a$ and lengths of remaining inhomogeneous lens components are each represented by $L_b$, the following conditions are satisfied:

$$((n/2)+0.15)\ P < L_a < ((n/2)+0.35)\ P$$

$$L_b = n/2\ P$$

where reference symbol n represents the positive integer.

13. An optical system for endoscopes according to claim 1, wherein said objective lens unit includes an inhomogeneous lens having refractive index distribution that refractive index reduces progressively in going from a center portion toward a periphery and power increases from an object side toward an eyepiece side along an optical axis.

* * * * *